US010791135B2

(12) United States Patent
Halme et al.

(10) Patent No.: US 10,791,135 B2
(45) Date of Patent: Sep. 29, 2020

(54) INSPECTION OF NETWORK TRAFFIC IN A SECURITY DEVICE AT OBJECT LEVEL

(71) Applicant: Forcepoint LLC, Austin, TX (US)

(72) Inventors: Mirja Halme, Helsinki (FI); Otto Airamo, Helsinki (FI); Valtteri Rahkonen, Helsinki (FI); Tuomo Syvänne, Helsinki (FI)

(73) Assignee: Forcepoint LLC, Austin, TX (US)

( * ) Notice: Subject to any disclaimer, the term of this patent is extended or adjusted under 35 U.S.C. 154(b) by 190 days.

(21) Appl. No.: 16/162,993

(22) Filed: Oct. 17, 2018

(65) Prior Publication Data
US 2020/0128032 A1   Apr. 23, 2020

(51) Int. Cl.
*H04L 29/06* (2006.01)
*H04L 12/66* (2006.01)
*H04L 12/863* (2013.01)

(52) U.S. Cl.
CPC .......... *H04L 63/1425* (2013.01); *H04L 12/66* (2013.01); *H04L 47/6205* (2013.01); *H04L 63/1416* (2013.01); *H04L 63/164* (2013.01); *H04L 63/20* (2013.01); *H04L 69/04* (2013.01); *H04L 69/08* (2013.01)

(58) Field of Classification Search
CPC ................................................. H04L 63/1425
USPC ........................................................ 726/23
See application file for complete search history.

(56) References Cited

U.S. PATENT DOCUMENTS

| 10,291,682 B1* | 5/2019 | Vishwanathan | ...... H04L 69/161 |
| 2018/0063220 A1* | 3/2018 | Dhanabalan | ........ H04L 67/2838 |
| 2019/0199814 A1* | 6/2019 | Suzuki | .................... H04L 67/26 |
| 2019/0245866 A1* | 8/2019 | Anderson | ............. H04L 63/166 |

* cited by examiner

*Primary Examiner* — Peter C Shaw
(74) *Attorney, Agent, or Firm* — Jackson Walker L.L.P.

(57) ABSTRACT

A method, system, and computer-usable medium are disclosed for, responsive to establishment of a connection between a first endpoint device and a second endpoint device: maintaining, by a security device interfaced between the first endpoint device and the second endpoint device for inspecting traffic transmitted over the connection, a first communication state to be identical to a communication state of the first endpoint device; and maintaining, by the security device, a second communication state to be identical to a communication state of the second endpoint device; and responsive to transmission of traffic from the first endpoint and intended for the second endpoint: inspecting individual objects of the traffic; modifying stream identifiers of the individual objects prior to retransmission of the traffic to the second endpoint to maintain ordering of stream identifiers as seen by the second endpoint; and maintaining a mapping of the modified stream identifiers such that the mapping is used by the security device such that responses transmitted by the second endpoint in response to the objects transmitted by first endpoint device are modified to their original stream identifiers of the objects transmitted by first endpoint device.

18 Claims, 3 Drawing Sheets

INSPECTION OF NETWORK TRAFFIC IN A SECURITY DEVICE AT OBJECT LEVEL

FIELD OF DISCLOSURE

The present invention relates in general to the field of computers and similar technologies, and in particular to software utilized in this field. Still more particularly, it relates to a method, system, and computer-usable medium for inspection of network traffic in a security device at the object level.

BACKGROUND

While network communication among networked computers, including the use of the Internet, has many advantages, one downside to network communication is that it may render networked computers susceptible to malicious attacks from viruses or other intrusions. One common way in which to protect an endpoint device from malicious attacks is to perform inspection with a security device (e.g., a gateway) interfaced in a communication path between endpoints (e.g., a server and a client) of the communication path.

Security devices (e.g., gateway devices) are often configured to analyze web communication protocols to perform deep inspection of communications including uniform resource locator (URL) classification, anti-malware inspection and filtering, file reputation inspection and filtering, and sandbox analysis. In order to prevent unwanted traffic from reaching an endpoint device, a connection may be blocked (to hold at least part of an object within network traffic) until the inspection of an object (such as a URL, Hypertext Markup Language (HTML) page, or executable file) has been completed and the object has been found to be allowed according to the security policy.

Hypertext Transfer Protocol (HTTP) Version 1.1 (HTTP/1.1) is able to transfer several objects in one Transport Communication Protocol (TCP) connection. A client may send several requests in one TCP connection in pipelined manner so that it can send a new request before the responses of earlier requests have been received. The server sends its responses in the same order than the client sends its requests.

In addition, HTTP Version 2 (HTTP/2) is able to transfer several objects in one TCP connection. But unlike HTTP/1.1, in HTTP/2 a server can send its response in any order. It's also possible to multiplex server responses so that there may exist several responses in transit at the same time. Because HTTP/2 allows a server to send any requested object as soon as it is ready (without need to wait for objects requested earlier to become ready for sending) the so-called head-of-line blocking problem can be avoided.

However, inspecting HTTP/2 traffic in a gateway device at the connection level (block the connection until an object is found allowed) may re-introduce the head-of-line blocking problem avoided by the design of HTTP/2. The security inspection of each object in a stream may be performed sequentially. Even if the inspection can be at least partially performed in parallel by utilizing various data buffering techniques the head-of-line blocking problem is still present because an object taking a longer time for inspection blocks other objects that may be faster to inspect.

Another potential problem to inspecting HTTP/2 traffic in a gateway device at the connection level is that an object that is disallowed according to a security policy may force disallowance of all the remaining objects in the connection. For example, if an HTML page includes an advertisement image that is classified as disallowed, the entire page might be prevented from being displayed although the remaining page content may be allowed.

One solution to the head-of-line blocking problem in HTTP/1.1 was to open several connections from a client to server in order to allow some parallel operations and partially avoid head-of line-blocking. However, such a solution created increased load to servers and did not allow TCP to reach its full speed. In HTTP/2, better efficiency may reached through multiplexing within a single TCP connection. However, absent the systems and methods disclosed below in this disclosure, HTTP/2 inspection would still cause the head-of-line blocking problem, taking the advantages of parallel operations of HTTP/2 and potentially create a result in which HTTP/2 would provide less effective communication than that of HTTP/1.1.

SUMMARY

In accordance with the teachings of the present disclosure, certain disadvantages and problems associated with existing approaches to network and data security have been reduced or eliminated.

In accordance with embodiments of the present disclosure, a computer-implementable method for managing network communication may include responsive to establishment of a connection between a first endpoint device and a second endpoint device: maintaining, by a security device interfaced between the first endpoint device and the second endpoint device for inspecting traffic transmitted over the connection, a first communication state to be identical to a communication state of the first endpoint device; and maintaining, by the security device, a second communication state to be identical to a communication state of the second endpoint device; and responsive to transmission of traffic from the first endpoint and intended for the second endpoint: inspecting individual objects of the traffic; modifying stream identifiers of the individual objects prior to retransmission of the traffic to the second endpoint to maintain ordering of stream identifiers as seen by the second endpoint; and maintaining a mapping of the modified stream identifiers such that the mapping is used by the security device such that responses transmitted by the second endpoint in response to the objects transmitted by first endpoint device are modified to their original stream identifiers of the objects transmitted by first endpoint device.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for responsive to establishment of a connection between a first endpoint device and a second endpoint device: maintaining, by a security device interfaced between the first endpoint device and the second endpoint device for inspecting traffic transmitted over the connection, a first communication state to be identical to a communication state of the first endpoint device; and maintaining, by the security device, a second communication state to be identical to a communication state of the second endpoint device; and responsive to transmission of traffic from the first endpoint and intended for the second endpoint: inspecting individual objects of the traffic; modifying stream identifiers of the individual objects prior to retransmission of the traffic to the second endpoint to maintain ordering of stream identifiers as seen by the second endpoint; and maintaining a mapping of the modified stream identifiers such that the mapping is used by the security device such that responses transmitted by the second endpoint in response to the objects transmitted by first endpoint device are modified to their original stream identifiers of the objects transmitted by first endpoint device.

In accordance with these and other embodiments of the present disclosure, a non-transitory, computer-readable storage medium may embody computer program code, the computer program code comprising computer executable instructions configured for responsive to establishment of a connection between a first endpoint device and a second endpoint device: maintaining, by a security device interfaced between the first endpoint device and the second endpoint device for inspecting traffic transmitted over the connection, a first communication state to be identical to a communication state of the first endpoint device; and maintaining, by the security device, a second communication state to be identical to a communication state of the second endpoint device; and responsive to transmission of traffic from the first endpoint and intended for the second endpoint: inspecting individual objects of the traffic; modifying stream identifiers of the individual objects prior to retransmission of the traffic to the second endpoint to maintain ordering of stream identifiers as seen by the second endpoint; and maintaining a mapping of the modified stream identifiers such that the mapping is used by the security device such that responses transmitted by the second endpoint in response to the objects transmitted by first endpoint device are modified to their original stream identifiers of the objects transmitted by first endpoint device.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
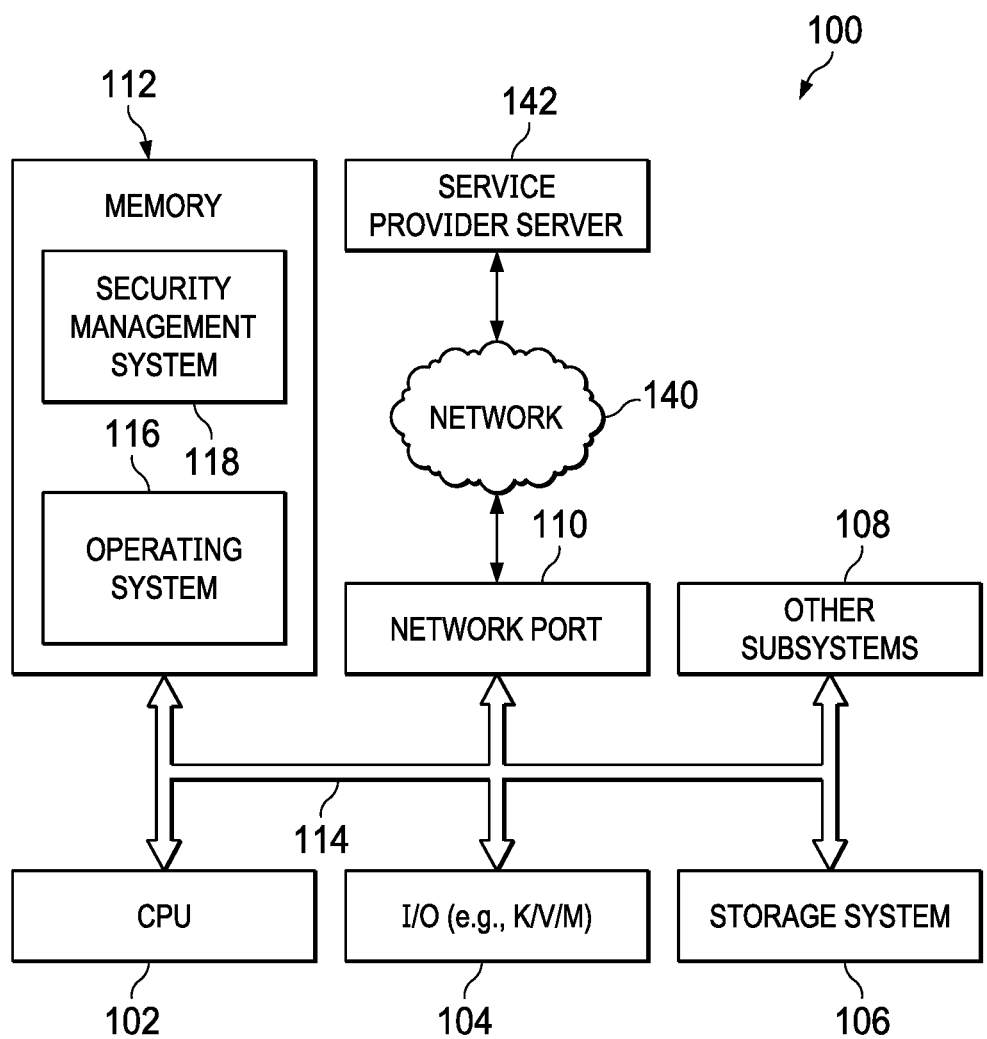
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security management system 118. In some embodiments, information handling system 100 may be able to download security management system 118 from service provider server 142. In other embodiments, security management system 118 may be provided as a service from the service provider server 142.

In various embodiments, security management system 118 may be configured to enable inspection of network in a security device at the object level of a network traffic stream, as described in greater detail below. In some embodiments, security management system 118 and the functionality thereof may improve processor efficiency, and thus the efficiency of information handling system 100, by performing network security operations with greater efficiency and with decreased processing resources as compared to existing approaches for similar network security operations. In these and other embodiments, security management system 118 and the functionality thereof may improve effectiveness in ensuring network security, and thus the effectiveness of information handling system 100, by performing network security operations with greater effectiveness as compared to existing approaches for similar network security operations. As will be appreciated, once information handling system 100 is configured to perform the functionality of security management system 118, information handling system 100 becomes a specialized computing device specifically configured to perform the functionality of security management system 118, and is not a general purpose computing device. Moreover, the implementation of functionality of security management system 118 on information handling system 100 improves the functionality of information handling system 100 and provides a useful and concrete result of improving network security and performing network security operations with greater efficiency and with decreased processing resources by enabling inspection of network in a security device at the object level of a network traffic stream as described herein.

Figure 2:
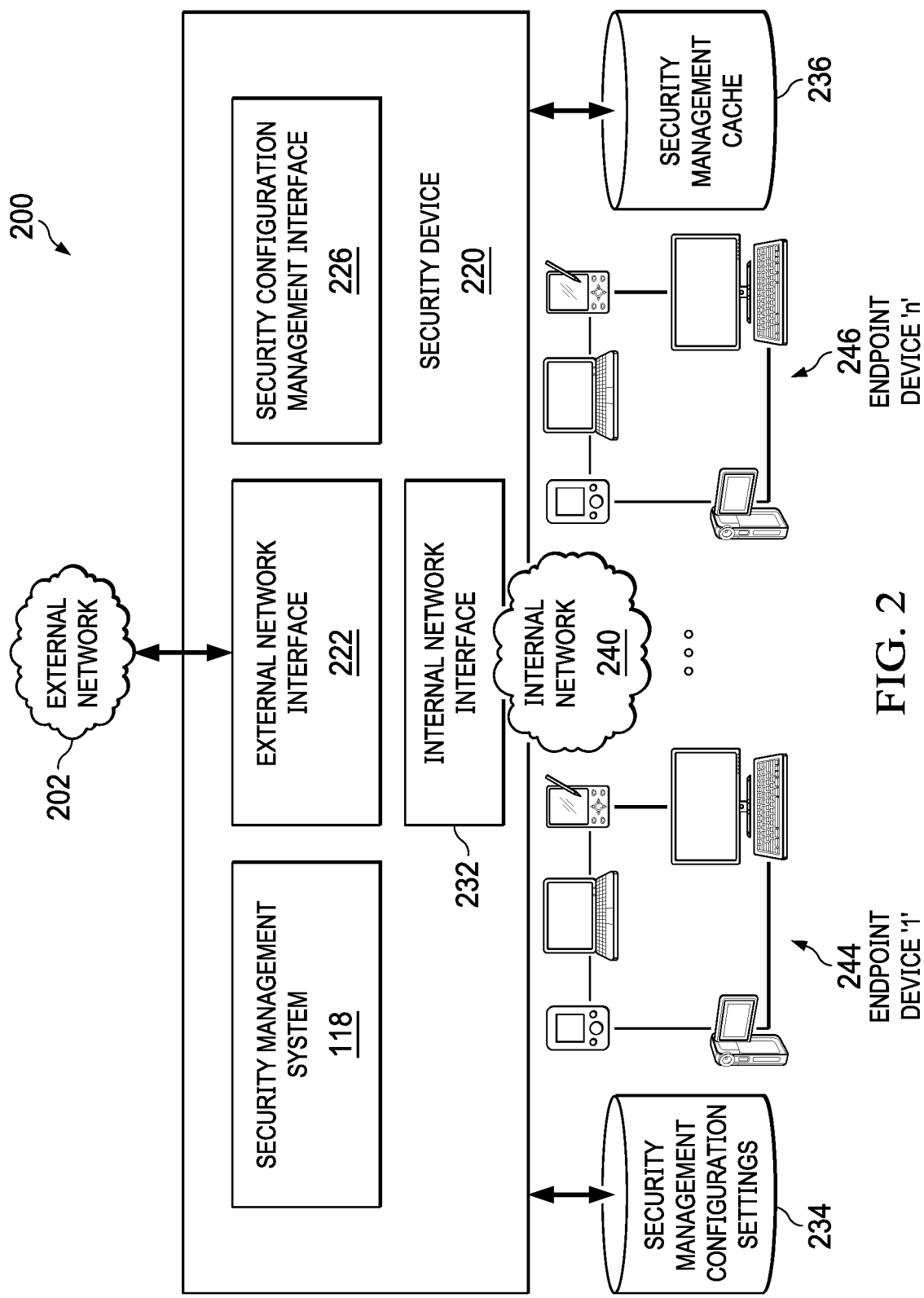
FIG. 2 illustrates a block diagram of a system for performing inspection of network traffic in a security device at the object level of network traffic, in accordance with embodiments of the present disclosure.

FIG. 2 illustrates a block diagram of a system 200 for performing inspection of network traffic in a security device at the object level of network traffic. In some embodiments, a security device 220 may include an external network interface 222, a security configuration management interface 226, an internal network interface 232, and a security management system 118. Security device 220 may be implemented using any suitable information handling system 100, including without limitation a gateway, a firewall, an electronic mail server, a web server, a file transfer protocol server, or any other suitable security device capable of implementing security management system 118. In some embodiments, security device 220 may be implemented as an individual security device 220, a virtual context security device 220, or a security device 220 cluster.

Security device 220 may also include in some embodiments a repository of security management configuration settings 234 and a security management cache 236. In certain embodiments, security configuration management interface 226 may be implemented to receive instructions relating to network security policy decisions from security management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that it may be desirable to secure such network communication to prevent communication of sensitive information and/or malicious content. Many existing solutions for providing security in a network environment have disadvantages, as described in the Background section of this application. However, security management system 118 as disclosed herein may overcome these disadvantages by enabling inspection of network in a security device at the object level of a network traffic stream, as described herein.

For purposes of clarity and exposition, security management system 118 is shown as integral to security device 220. However, in some embodiments, security management system 118 may be integral to an endpoint device 244, 246 and operate to perform inspection of network in a security device at the object level of a network traffic stream.

Although the foregoing contemplates that security management system 118 resides in security device 220, in some embodiments, security management system 118 may be implemented by a device external to security device 220, including without limitation a device within external network 202. In yet other embodiments, the functionality described above may be implemented within a client device (e.g., endpoint device 244, 246) and/or a cloud-based inspection system.

Figure 3:
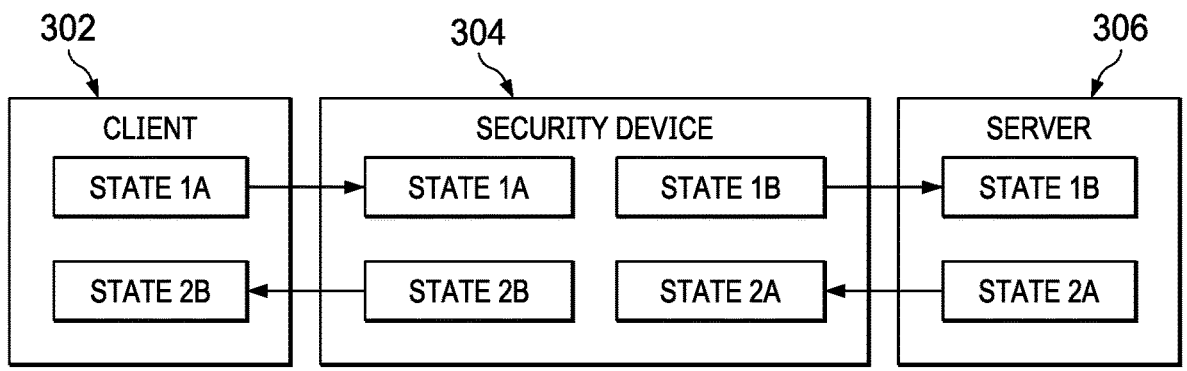
FIG. 3 illustrates a block diagram depicting maintenance of connection states with endpoint devices by a security device, in accordance with embodiments of the present disclosure.

FIG. 3 illustrates a block diagram depicting maintenance of connection states with endpoint devices (e.g., client 302, server 306) by security device 304, in accordance with embodiments of the present disclosure. As shown in FIG. 3, security device 304, which may comprise a gateway, may be interfaced between client 302 and server 306. In some embodiments, security device 304 may be implemented by security device 220 of FIG. 2. In these and other embodiments, client 302 may be implemented by an endpoint device 244 or 246 of FIG. 2. In these and other embodiments, server 306 may be implemented by a server communicatively coupled to external network 202 of FIG. 2, such that external network 202 is interfaced between the server and security device 220.

HTTP/2 uses a header compression algorithm known in the HTTP/2 standard as HPACK. In operation, for each connection between a client and server, HPACK maintains a state in each direction of the connection. Thus, each time a peer communicates a header frame, the sending peer updates its copy of the state. When other another peer receives the header frame, the receiving peer updates its copy of the state in the same manner Therefore, although state itself is not transmitted between two peers in a connection, the two peers may maintain an identical view of the state. However, if header frames were to arrive in a different order then sent, the peers would no longer have an identical view of the state.

To prevent this potential problem when security device 304 is interfaced between peers client 302 and server 306, security device 304 may itself maintain two states for each direction of a connection: one which is maintained to be identical with the sending peer state and one which is maintained to be identical with the receiving peer state. For example, as shown in FIG. 3, in the direction of communication from client 302 to server 306, security device 304 may maintain a first state 1A between client 302 and security device 304 and a second state 1B between security device 304 and server 306. Similarly, in the direction of communication from server 306 to client 302, security device 304 may maintain a first state 2A between server 306 and security device 304 and a second state 2B between security device 304 and client 302.

Accordingly, when security device 304 re-transmits a header frame, it updates the state of the peer to which it is transmitting the header frame and uses such state to modify compression of the headers transmitted, and full decompression and recompression of header frames is not needed to maintain protocol integrity.

Figure 4:
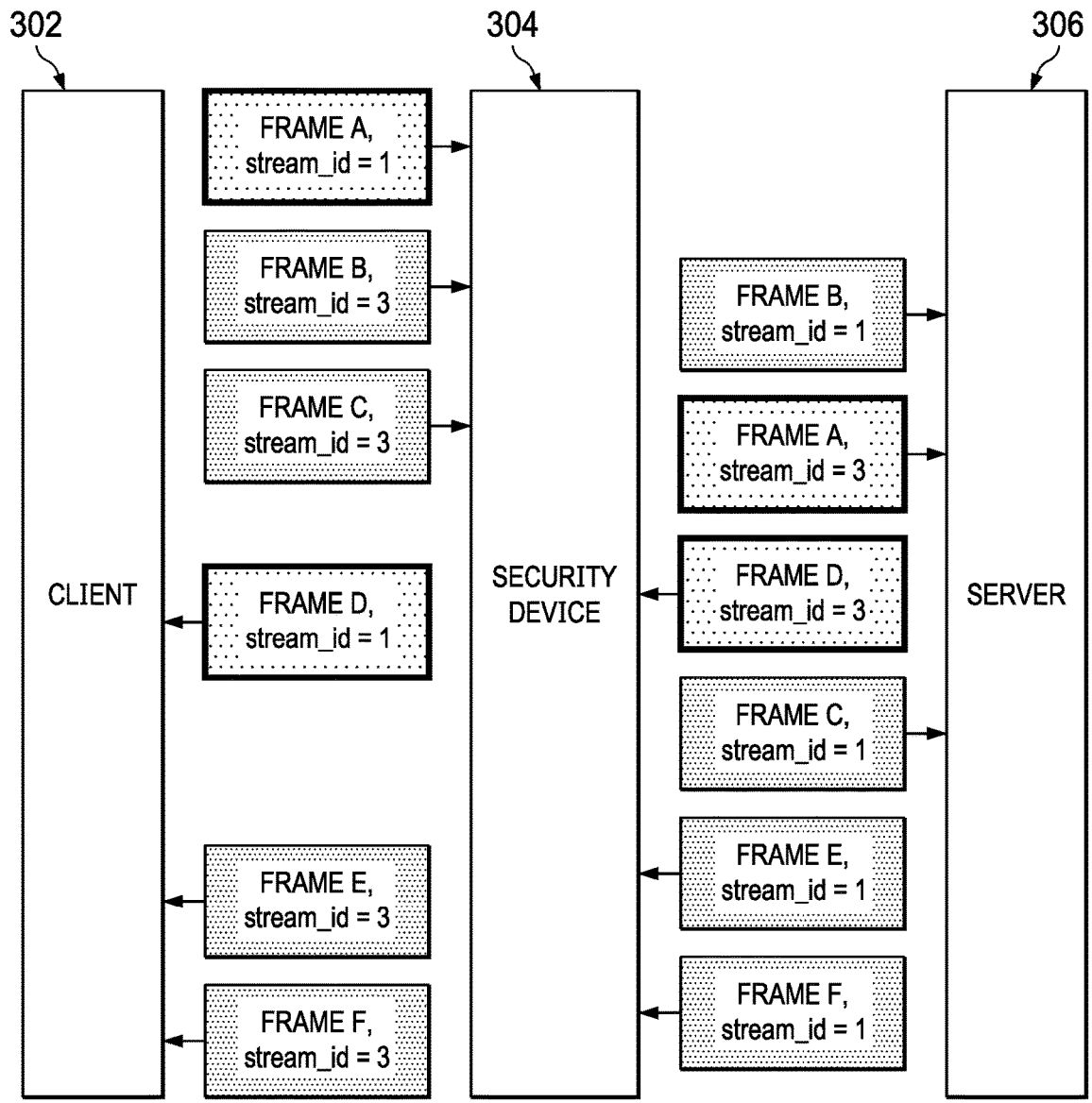
FIG. 4 illustrates a block diagram depicting handling of communication streams between endpoint devices by a security device, in accordance with embodiments of the present disclosure.

FIG. 4 illustrates a block diagram depicting handling of communication streams between endpoint devices (e.g., client 302, server 306) by security device 304, in accordance with embodiments of the present disclosure.

In HTTP/2, each object is transferred in a separate stream identified by an integer number. These streams are opened simply by sending the first frame of the stream from the sending peer. Under HTTP/2, the stream identifier of a new stream must always be bigger than any of the previously opened streams in the same direction. Thus, security device 304 may be configured to, when reordering opening frames of individual object streams, modify the individual stream identifiers so that the stream identifiers appear to be increasing to the receiving peer. Accordingly, security device 304 may maintain a mapping between stream identifiers of streams it received from a sending peer to stream identifiers of streams that it retransmits to a receiving peer. In accordance with such mapping, the same modification to stream identifiers may be made to all frames of a stream in the same direction and the original stream identifier may be restored by the mapping when retransmitting frames in the opposite direction. For example, FIG. 4 depicts a simplifier scenario in which client 302 transmits to security device 304 a stream with a stream identifier of "1" having a frame "a" and transmits to security device 304 a stream with a stream identifier of "3" having frames "b" and "c." Security device 304 may process a frame (e.g., frame "b") of the stream with stream identifier "3" before processing a frame of the stream with stream identifier "1." As a result, when retransmitting the streams to server 306, security device 306 may modify the stream identifier of stream "1" to "3" and modify the stream identifier of stream "3" to "1," such that server 306 receives streams with increasing identifiers. Security device 306 may also store the mapping of the modifications to the stream identifiers such that when server 306 responds, streams are appropriately converted back to the same stream identifiers of the frames to which the response streams are responding to.

The techniques used above for maintaining the protocol integrity when reordering the frames may also make it possible to cease retransmitting frames of a particular stream while continuing to retransmit frames of other streams. This way a stream including an object disallowed by a security policy of security device 304 may be permanently blocked while other objects in the same connection may be allowed through security device 304. In some embodiments, security device may be configured to craft a special-purpose response object that includes a human readable description of the security policy violation and transmit such special-purpose response as the response to the stream that included the security policy violation.

In accordance with the techniques described above, a security device (e.g., a gateway device) may be enabled to modify frames and connection state information in order to reorder network traffic frames (e.g., HTTP/2 frames) so that once inspection of any object is ready it can be retransmitted by the security device while another object earlier received by the security device is being inspected.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A computer-implementable method for managing network communication, comprising:
responsive to establishment of a connection between a first endpoint device and a second endpoint device:
maintaining, by a security device interfaced between the first endpoint device and the second endpoint device for inspecting traffic transmitted over the connection, a first communication state to be identical to a communication state of the first endpoint device; and
maintaining, by the security device, a second communication state to be identical to a communication state of the second endpoint device; and
responsive to transmission of traffic from the first endpoint and intended for the second endpoint:
inspecting individual objects of the traffic;
modifying stream identifiers of the individual objects prior to retransmission of the traffic to the second endpoint to maintain ordering of stream identifiers as seen by the second endpoint; and
maintaining a mapping of the modified stream identifiers such that the mapping is used by the security device such that responses transmitted by the second endpoint in response to the objects transmitted by first endpoint device are modified to their original stream identifiers of the objects transmitted by first endpoint device.

2. The method of claim 1, wherein the security device is a gateway device.

3. The method of claim 1, wherein:
one of the first endpoint device and the second is a client device; and
the other of the first endpoint device and the second is a server device.

4. The method of claim 1, wherein the connection is a Hypertext Transfer Protocol Version 2-compliant connection.

5. The method of claim 1, further comprising:
maintaining, by the security device, a third communication state to be identical to a receiving communication state of the first endpoint device; and
maintaining, by the security device, a fourth communication state to be identical to a transmitting communication state of the second endpoint device.

6. The method of claim 1, wherein the first communication state and the second communication state are each a communication state associated with a header compression algorithm for frames of the traffic.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
responsive to establishment of a connection between a first endpoint device and a second endpoint device:
maintaining, by a security device interfaced between the first endpoint device and the second endpoint device for inspecting traffic transmitted over the connection, a first communication state to be identical to a communication state of the first endpoint device; and
maintaining, by the security device, a second communication state to be identical to a communication state of the second endpoint device; and
responsive to transmission of traffic from the first endpoint and intended for the second endpoint:
inspecting individual objects of the traffic;
modifying stream identifiers of the individual objects prior to retransmission of the traffic to the second endpoint to maintain ordering of stream identifiers as seen by the second endpoint; and
maintaining a mapping of the modified stream identifiers such that the mapping is used by the security device such that responses transmitted by the second endpoint in response to the objects transmitted by first endpoint device are modified to their original stream identifiers of the objects transmitted by first endpoint device.

8. The system of claim 7, wherein the security device is a gateway device.

9. The system of claim 7, wherein:
one of the first endpoint device and the second is a client device; and
the other of the first endpoint device and the second is a server device.

10. The system of claim 7, wherein the connection is a Hypertext Transfer Protocol Version 2-compliant connection.

11. The system of claim 7, the instructions further configured for:
maintaining, by the security device, a third communication state to be identical to a receiving communication state of the first endpoint device; and
maintaining, by the security device, a fourth communication state to be identical to a transmitting communication state of the second endpoint device.

12. The system of claim 7, wherein the first communication state and the second communication state are each a communication state associated with a header compression algorithm for frames of the traffic.

13. The medium of claim 7, the instructions further configured for:
maintaining, by the security device, a third communication state to be identical to a receiving communication state of the first endpoint device; and
maintaining, by the security device, a fourth communication state to be identical to a transmitting communication state of the second endpoint device.

14. The medium of claim 7, wherein the first communication state and the second communication state are each a communication state associated with a header compression algorithm for frames of the traffic.

15. A non-transitory, computer-readable storage medium embodying computer program code, the computer program code comprising computer executable instructions configured for:
responsive to establishment of a connection between a first endpoint device and a second endpoint device:
maintaining, by a security device interfaced between the first endpoint device and the second endpoint device for inspecting traffic transmitted over the connection, a first communication state to be identical to a communication state of the first endpoint device; and
maintaining, by the security device, a second communication state to be identical to a communication state of the second endpoint device; and responsive to transmission of traffic from the first endpoint and intended for the second endpoint:
inspecting individual objects of the traffic;
modifying stream identifiers of the individual objects prior to retransmission of the traffic to the second endpoint to maintain ordering of stream identifiers as seen by the second endpoint; and
maintaining a mapping of the modified stream identifiers such that the mapping is used by the security device such that responses transmitted by the second endpoint in response to the objects transmitted by first endpoint device are modified to their original stream identifiers of the objects transmitted by first endpoint device.

16. The medium of claim 15, wherein the security device is a gateway device.

17. The medium of claim 15, wherein:
one of the first endpoint device and the second is a client device; and
the other of the first endpoint device and the second is a server device.

18. The medium of claim 15, wherein the connection is a Hypertext Transfer Protocol Version 2-compliant connection.

* * * * *